United States Patent
Lampela et al.

(10) Patent No.: US 6,757,533 B2
(45) Date of Patent: Jun. 29, 2004

(54) RICH CALLING LINE HANDLING IN CALL SETUP SIGNALLING

(75) Inventors: Juha Lampela, Oulu (FI); Juha Kalliokulju, Vesilahti (FI); Topi Koskinen, Tampere (FI); Krisztian Kiss, Sáástájákatu (HU)

(73) Assignee: Nokia Corporation, Espoo (FI)

( * ) Notice: Subject to any disclaimer, the term of this patent is extended or adjusted under 35 U.S.C. 154(b) by 45 days.

(21) Appl. No.: 10/052,560

(22) Filed: Jan. 23, 2002

(65) Prior Publication Data

US 2003/0139172 A1 Jul. 24, 2003

(51) Int. Cl.[7] ............................................... H04M 3/42
(52) U.S. Cl. ................. 455/415; 455/412.2; 455/414.1; 455/466; 379/93.01; 379/88.13; 379/201.1
(58) Field of Search .............................. 455/415, 412.1, 455/412.2, 414.1, 466, 517, 461; 379/93.01, 93.23, 209, 88.13, 142, 201.01, 201.4, 201.07, 201.08

(56) References Cited

U.S. PATENT DOCUMENTS

| | | | | |
|---|---|---|---|---|
| 5,073,927 A | * | 12/1991 | Grube | 348/14.01 |
| 5,559,868 A | * | 9/1996 | Blonder | 379/93.23 |
| H1714 H | * | 3/1998 | Partridge, III | 348/14 |
| 5,761,279 A | * | 6/1998 | Bierman et al. | 379/93.23 |
| 5,847,752 A | * | 12/1998 | Sebestyen | 348/14.12 |
| 5,907,604 A | * | 5/1999 | Hsu | 379/142.06 |
| 6,085,105 A | * | 7/2000 | Becher | 455/517 |
| 6,240,449 B1 | * | 5/2001 | Nadeau | 709/223 |

* cited by examiner

Primary Examiner—William Trost
Assistant Examiner—Stephen D Agosta
(74) Attorney, Agent, or Firm—Antonelli, Terry, Stout & Kraus, LLP

(57) ABSTRACT

A. telecommunications system, utilizing rich calling line handling in call setup signaling to forward RCLIP (Rich Calling Line Identification Presentation) data, forwards at least one call setup signal from the calling party terminal of a caller to a called party terminal of a called party via a network upon the caller desiring to initiate a called without RCLIP data. Upon the caller desiring to initiate a call with RCLIP data, the RCLIP data can either be forwarded with at least one call setup signal directly from the calling party terminal to the called party terminal or can be forwarded with the RCLIP data being attached by the network in accordance with an indicator from the calling party, the RCLIP data being stored in a database in the network. The RCLIP data can be presented to the called party immediately upon the called party terminal ringing/alerting.

56 Claims, 2 Drawing Sheets

ID=RICH CALLING LINE HANDLING IN CALL SETUP SIGNALLING

BACKGROUND OF THE INVENTION

1. Field of the Invention

The present invention relates to rich calling line handling and more particularly, the present invention relates to a technique utilizing rich calling line service to deliver multimedia information in the form of RCLIP (Rich Calling Line Identification Presentation) data from a caller to a called party.

2. Description of the Related Art

Presently, when a caller initiates a telephone call to a called party, at best, the called party receives the telephone number of the caller utilizing the presently available Caller ID service and may receive the name of the caller if the telephone network of the called party has the capability of accessing a database which correlates telephone numbers with registered users of these telephone numbers or alternatively, if the terminal of the called party has a stored database which correlates telephone numbers with registered users of these telephone numbers.

U.S. Pat. No. 6,240,449 to Nadeau discloses a method and apparatus for automatic call setup in different network domains, that is, a method and a system for managing communication sessions originating in either one of a telecommunications network, such as the PSTN network or a mobile telephone network, and a data communications network such as the Internet. The system includes a service logic controller supporting a data structure that holds a plurality of communication session disposition program records. The service logic controller connects with the telecommunications network and with the data communications network through respective gateways that transmit communication session disposition inquiry messages. In response to those messages, the service logic controller retrieves the appropriate communication session disposition program. If the program is instructive to establish an Internet domain connection, the service logic controller transmits to a gatekeeper functional element an Internet address request. The service logic controller then generates an instruction to the entity that originated the inquiry message in accordance with a response from the gatekeeper functional element. If the program does not require an Internet connection, the service logic controller generates an instruction to the entity that originated the inquiry message in accordance with the program itself. The communication session is then processed according to the instruction.

U.S. Pat. No. 6,226,363 to Miller discloses a method and system for the recording and selective accessing of messages using a computer, a remote unit, and a public communication system. As noted in Miller, a telephone messaging system is provided that includes a telephonic component, a computer, and an interface between the telephonic component and the computer. The telephonic component receives and processes messaging requests from a remote unit. The computer stores messages and provides message information to the telephonic component in response to the messaging requests. The interface allows the computer to operate at a faster speed than the telephonic component. The computer contains a fast memory and a primary storage device for storing message data. The telephone messaging system is accessed by first storing a message in memory, then providing an n-word title for the message, each word being k-characters. Then a number of topic terms are created to identify the message by combining the n words from the title in two-word combinations without concern as to the order of each of the n topic words in the q topic terms. Messages stored in the system can then be accessed by the topic terms.

U.S. Pat. No. 6,167,127 to Smith et al. discloses a telephone system using recorded messages to make outbound announcements. As noted in Smith et al., an automated telephone system includes a telephone terminal for communicating with a remote party over a telephone line; a storage device for storing a plurality of pre-recorded voice messages entered through said terminal; and a service controller connected to the telephone terminal and the storage device. The service controller is responsive to commands entered through the telephone terminal either to store spoken messages in said storage device and associate them with a unique identifier, or to access a selected one of the stored messages using its unique identifier and replay it over the telephone line to a remote party.

U.S. Pat. No. 6,085,105 to Becher discloses a method for it ministry additional services in a mobile communication network. As noted in Becher, for administering additional services, additional information about the allocation of additional services to service control units and about the status of the respective additional service are stored subscriber-associated in two memory units of the mobile communication network allocated to a subscriber. In a call setup, an interrogation of this additional information ensues. This can lead to a service request at the allocated service control unit.

U.S. Pat. No. 6,044,264 to Huotari discloses a method for activating intelligent network services in a mobile communication system, and a mobile communication system. That is, Huotari relates to a mobile communication network and a method for activating intelligent network services in the mobile communication network. In the invention, the mobile services switching center (MSC) operates as the service switching point of the intelligent network. The mobile services switching center stores the service triggers, which service triggers comprise the triggering criteria for the services and the information required for visiting the service control point (SCP). The mobile subscriber's subscriber data in the subscriber database (HLR) is provided with an intelligent network service trigger key which points to one or more service triggers. As the mobile services switching center obtains the trigger key of the mobile subscriber during the call setup, it activates the service triggers indicated by the key. As the triggering criteria of the service trigger are met at some phase of the call, the mobile services switching center triggers the respective intelligent network service in the service control point (SCP) indicated by the service trigger.

U.S. Pat. No. 5,847,752 to Sebestyen discloses a method and arrangement for connection setup and control of digitally compressed audio, video and data signals between videotelephones of the analog and digital communication networks (for example, telephone network, mobile telecommunication) and a method and arrangement for the transmission of still pictures and/or between videotelephones of the same category are disclosed. In videotelephony, a bi-directional full-duplex information exchange is fundamentally assumed in both directions, that is, both communicating videotelephone terminal equipment are usually transmitter and receiver of audio, video, control and, potentially, other information types at the same time. The method for connection setup between videotelephone communication terminal equipment in a transmission network using a protected transmission protocol in a framework of ITU-T V.8 initialization and of an ITU-T V.34 modem, has the steps of: supporting videotelephone communication within the framework of the ITU-T V.8 initialization in that at least a request for high transmission quality for videotelephone communication is signaled to the network during connection setup between a calling terminal equipment and a called terminal equipment; and recognizing in the calling terminal equipment a type of the called terminal equipment and a type of the transmission network connected thereto.

Lastly, U.S. Pat. No. 5,757,792 to Aoki discloses a mobile communication system and a method of communication mode transition, that is, a mobile communication system which enables any combinations of communication of speech signal and data signal to perform even during telephone communication is realized. In a mobile communication system provided with a base station control apparatus being connected to an ISDN switching unit, when data signal transmission is required while a mobile station being communicating with an ISDN terminal, a speech signal half-rate processing operation and a data signal transmission operation are commenced between the mobile station and the base station control apparatus. As for TDMA (Time Division Multiple Access) frames of signal between the mobile station and the base station, the full-rate (32 Kbps) speech signal is contained in all frames when only speech communication is performed, and each of the half-rare (16 Kbps) processed speech signal and the data signal is contained in every other frames alternatively when both of speech and data communication are performed simultaneously. At the ISDN terminal, speech signal is transferred through the B channel and data signal is transferred through the D channel.

However, none of these references teach or suggest utilizing rich calling line service to deliver multimedia information from a caller to a called party as in the present invention.

SUMMARY OF THE INVENTION

It is an object of the present invention to provide a telecommunications system utilizing rich calling line handling in call setup signaling to forward RCLIP (Rich Calling Line Identification Presentation) data.

In more detail, it is an object of the present invention to provide a telecommunications system comprising a calling party terminal of a caller; a network, the calling party terminal being selectively connected thereto; and a called party terminal of a called party, the network being selectively connected to the called party terminal, wherein, upon the caller desiring to initiate a call to the called party without RCLIP data, the calling party terminal forwards at least one call setup signal without attached RCLIP data via the network to the called party terminal. In some cases, it is necessary for the calling party terminal to forward more than one call setup signal since it may be necessary to divide the RCLIP data into several call setup signals due to the limited capability of each call setup signal to carry additional information, for example.

Furthermore, upon the caller desiring to initiate a call to the called party with caller generated RCLIP data, the calling party forwards at least one call setup signal with attached RCLIP data to the network which in turn forwards the at least one call setup signal with attached RCLIP data to the called party terminal.

Still furthermore, upon the caller desiring to initiate a call to the called party with RCLIP data stored in an RCLIP database in the network, the calling party forwards at least one call setup signal with an indicator indicating which piece of RCLIP data is to be forwarded to the called party to the network and the network accesses its RCLIP database to recover the piece of RCLIP data corresponding to the indicator forwarded by the calling party and forwards this RCLIP data attached to the at least one call setup signal to the called party terminal.

In addition, it is another object of the present invention to provide a method of operating a telecommunications system utilizing rich calling the line handling in call setup signaling to forward RCLIP (Rich Calling Line Identification Presentation) data, the system comprising: a calling party terminal of a caller; a network, the calling party terminal being selectively connected thereto; and a called party terminal of a called party, the network being selectively connected to the called party terminal, the method comprising the calling party terminal forwarding at least one call setup signal without attached RCLIP data via the network to the called party terminal upon the caller desiring to initiate a call to the called party without RCLIP data; and the calling party forwarding at least one call setup signal with attached RCLIP data to the network which in turn forwards the at least one call setup signal with attached RCLIP data to the called party terminal upon the caller desiring to initiate a call to the called party with caller generated RCLIP data; and the calling party forwarding at least one call setup signal with an indicator indicating which piece of RCLIP data is to be forwarded to the called party to the network and the network accesses its RCLIP database to recover the piece of RCLIP data corresponding to the indicator forwarded by the calling party and forwards this RCLIP data attached to the at least one call setup signal to the called party terminal upon the caller desiring to initiate a call to the called party with RCLIP data stored in an RCLIP database in the network.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and that the invention is not limited thereto. The spirit and scope of the present invention are limited only by the terms of the appended claims.

The following represents brief descriptions of the drawings, wherein.

DETAILED DESCRIPTION

Figure 1:
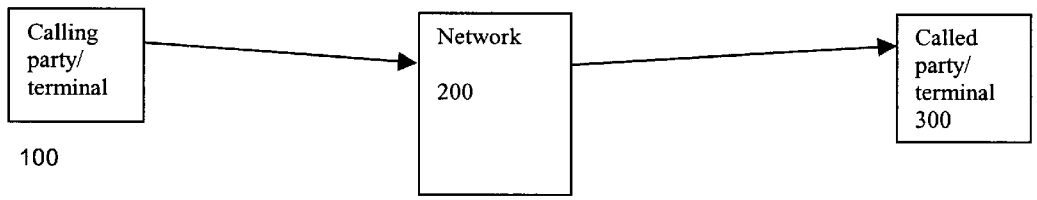
FIGS. 1–6 are block diagrams illustrated the various alternatives available to the caller with respect to forwarding multimedia information to a called party in accordance with various embodiments of the present invention.

Before beginning a detailed description of the subject invention, mention of the following is in order. When appropriate, like reference numerals and characters may be used to designate identical, corresponding, or similar components in differing drawing figures. Furthermore, in the detailed description to follow, example sizes/models/values/ranges may be given, although the present invention is not limited thereto. Arrangements may be shown a block diagram form in order to avoid obscuring the invention and also in view of the fact that specifics with respect to implementation of such block diagram arrangements are highly dependent upon the platform within which the present invention is to be implemented, that is, such specifics should be well within purview of one skilled the art. Where specific details are set forth in order to describe example embodiments of the invention, it should be apparent to one skilled the art that the invention can be practiced without, or with variations of, the specific details. Finally, it should be apparent that differing combinations of hard-wired circuitry and software instructions can be used to implement embodiments of the present invention, that is, the present invention is not limited to any specific combination of hardware and software.

Rich calling line service is a service which allows a caller to deliver multimedia information to a called party during the call setup signaling. The delivered data is available to the called party when the phone rings. The multimedia information may be forwarded directly from the caller or from the network disposed between the caller and the calling party. However, in either case, the caller controls whether or not information is to be transmitted and the content of the information. Alternatively, rich calling line service may be provided by a third party service provider if the third party service provider and network operator have agreed to such service.

The multimedia information to be delivered can vary from a simple text message to any combination of text, video, audio, still pictures, images, etc. The text message may simply be the name of the caller or may include an indication as to the importance of the telephone call, e.g.—VERY URGENT, URGENT, etc. The video message and/or audio message may include an introduction to the called party by the caller, for example. Still pictures may include a picture of the caller or a picture of a subject which the caller expects the called party to be interested in, e.g.—a child or grandchild. Images may include a corporate logo or other image that the caller which is to forward to the called party. It is of course understood that any combination of these multimedia information messages may be combined, e.g.—a still picture of a grandchild along with an audio greeting by the grandchild.

While, as noted above, present day telephone systems allow the transmission of the telephone number of the caller and, in some situations, the name of the caller using caller ID, present a telephone systems do not allow the caller to control the content of information transmitted to the called party other than to allow the caller to prevent the transmission of any information to the called party. On the other hand, the present invention allows the caller to control the content of information to be forwarded to the called party.

An RCLIP is defined to be a Rich Calling Line Identification Presentation, that is, data to be delivered to the called party during call setup. There are two different possibilities with regard to sending the RCLIP from the caller to the called party, namely, the RCLIP, which may be stored in the calling terminal of the caller or instantaneously generated by the caller, can be sent by the caller to the called party via the network, or, the RCLIP, stored in the network, can be sent by the network to the called party under the control of the caller. To enable both possibilities, an agreement must be reached with regard to the mechanism to be used by the network to determine when to attach an RCLIP to the call and when not to attach an RCLIP to the call (in the case when the caller does not wish to use the rich calling line service or when the caller has included an RCLIP stored in the calling terminal of the caller).

In the present invention, if the calling terminal forwards a call setup signal or signals to the network which has an RCLIP attached to the call setup signal or signals, then the network allows that data to pass transparently to the called party. On the other hand, when an RCLIP is not attached to the call setup signal or signals forwarded from the calling terminal to the network, then the network shall interpret a signal/code/indicator included in the call setup signal or signals forwarded by the calling terminal to the calling terminal network. The indicator indicates whether or not RCLIP data is to be attached to the call setup signal or signals by the network and if so, the indicator can include an index to a network database to indicate what information contained within an RCLIP is to be attached to the call setup signal or signals to be fowarded to the called party.

Note that the forwarding of RCLIP data can entail a significant amount of bandwidth, particularly in the case of video RCLIP data. Accordingly, it would be preferable to store the RCLIP data in a server on the network, if possible, so as to reduce the needed bandwidth between the caller and the network. This is particularly important in the case of mobile terminals where the bandwidth between a wireless mobile terminal and its network is limited.

It is possible to arrange the system so that under normal circumstances, the caller sets an indicator in the call setup signal or signals so as to inform the network as to which RCLIP data stored in the RCLIP database of the network is to be forwarded to the called party. Under special circumstances, the caller may forward RCLIP data directly to the network which then forwards the RCLIP data to the called party. The network can be prioritized so as to attach RCLIP data forwarded by the caller to the call setup signal to be forwarded to the called party in place of RCLIP data stored in the RCLIP database of the network.

Furthermore, the system can be arranged such that RCLIP data may be forwarded to the network by the caller along with an indicator in the call setup signal or signals informing the network to store the forwarded RCLIP data in its RCLIP database.

FIGS. 1–6 are block diagrams illustrating the various alternatives available to the caller with respect to forwarding multimedia information to a called party in accordance with various embodiments of the present invention.

For example, as illustrated in FIG. 1, if no RCLIP data is forwarded from the calling party/terminal 100 to the network 200, then no RCLIP data is fowarded from the network 200 to the called party/terminal 300.

Figure 2:
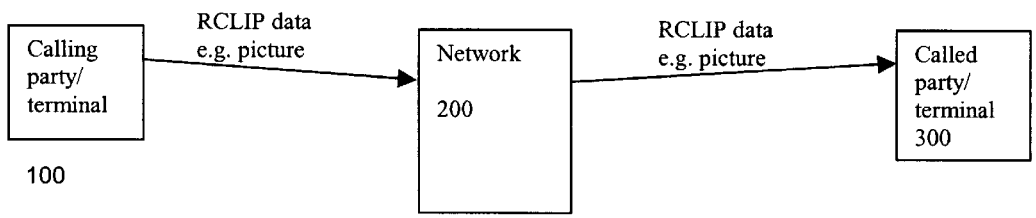

On the other hand, as illustrated in FIG. 2, if RCLIP data, for example, a picture, is forwarded from the calling party/terminal 100 to the network 200, then the network 200 transparently forwards the RCLIP data to the called party/terminal 300.

Figure 3:
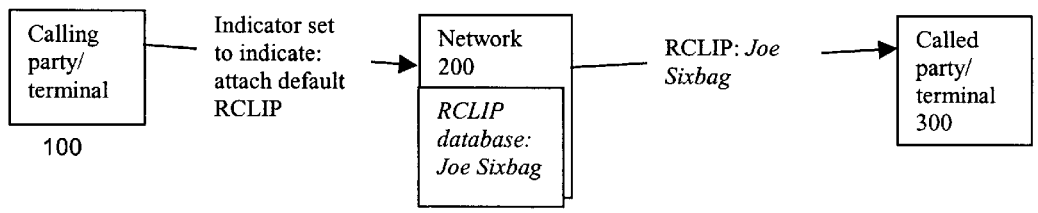

Alternatively, as illustrated in FIG. 3, if an indicator is set in the call setup signaling forwarded from the called party/terminal 100 to the network 200 indicating that a default RCLIP, stored in the RCLIP database of the network 200, is to be forwarded to the called party/terminal 300, then the network 200 accesses the default RCLIP, in this case, the name of the calling party, and forwards it to the called party/terminal 300.

Figure 4:
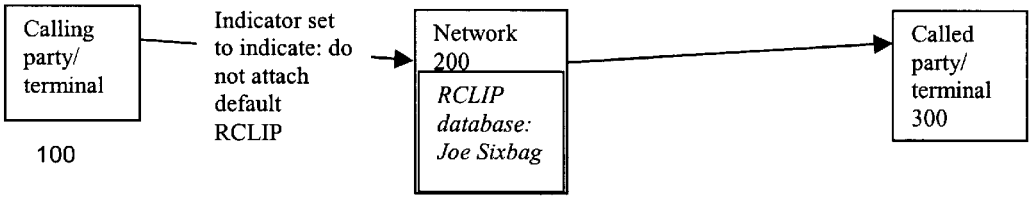

As another alternative, as illustrated in FIG. 4, if an indicator is set in the call setup signaling forwarded from the called party/terminal 100 to the network 200 indicating that no default RCLIP data is to be forwarded to the called party/terminal 300, then no RCLIP data is forwarded from the network 200 to the called party/terminal 300. It is of course presumed that no RCLIP data is forwarded from the called party/terminal 100 to the network 200.

Figure 5:
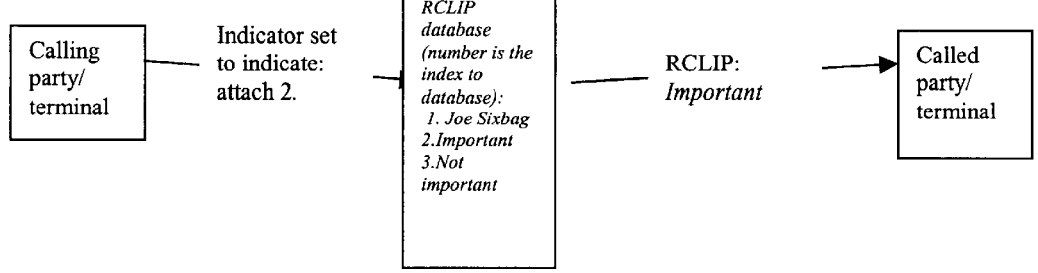

As still another alternative, as illustrated in FIG. 5, if an indicator is set in the call setup signaling forwarded from the called party/terminal 100 to the network 200 indicating that RCLIP attachment 2, stored in the RCLIP database of the network 200 is to be forwarded to the called party/terminal 300, then the network 200 accesses the RCLIP attachment 2, in this case the message that the call is important, and forwards it to the called party/terminal 300.

Figure 6:
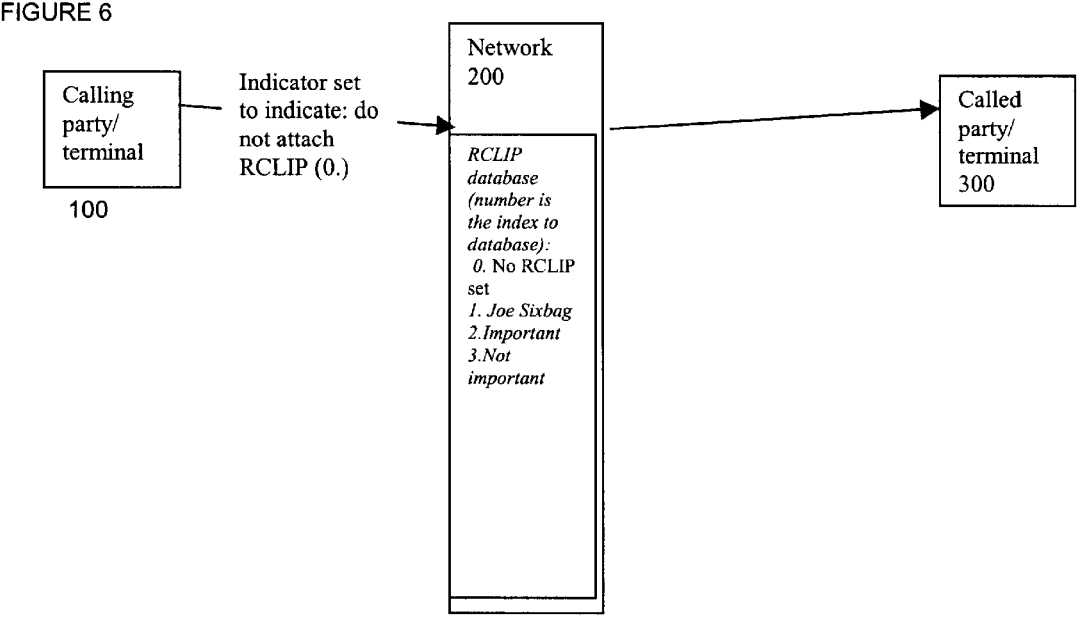

As yet another alternative, as illustrated in FIG. 6, if an indicator is set in the call setup signaling forwarded from the called party/terminal 100 to the network 200 indicating that no RCLIP data stored in the RCLIP database of the network 200 is to be forwarded to the called party/terminal 300, that is, RCLIP attachment 0 is accessed by the network 200 which indicates that no RCLIP data has been set, then no RCLIP data is forwarded from the network 200 to the called party/terminal 300. The distinction between FIG. 6 and FIG. 4 lies in the fact that in the RCLIP database of the network 200 in FIG. 6, attachment 0 is defined as indicating that no RCLIP data is to be sent whereas in FIG. 4, a different indication from that of the attachment number is used to indicate that no RCLIP data is to be sent.

Figure 7:
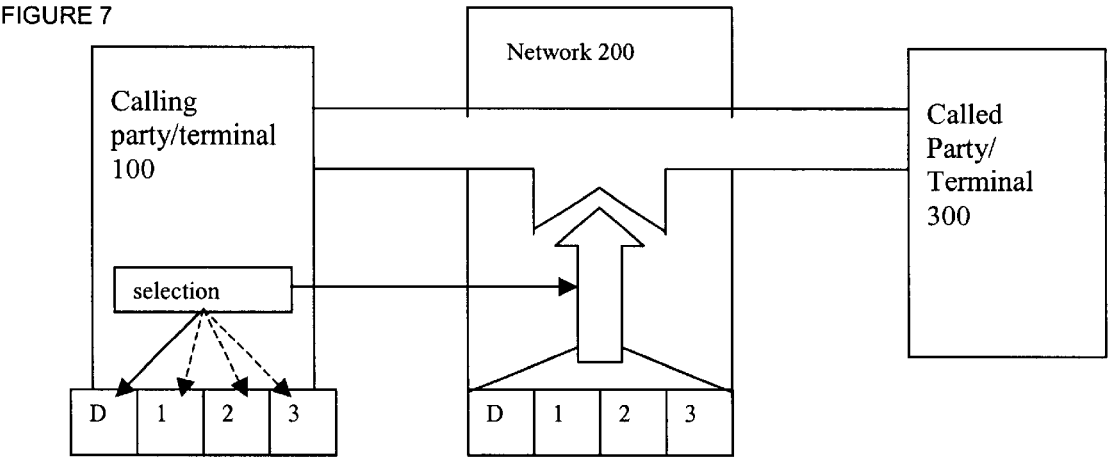
FIG. 7 is a block diagram illustrating the selection by the caller of alternative clips to be sent to the called party.

FIG. 7 is a block diagram illustrating the forwarding of RCLIP data from the calling party/terminal 100 to the called party/terminal 300. As illustrated in FIG. 7, the calling party 100 makes a selection between default indicator D and indicators 1, 2, and 3. In order to inform the calling party as to what RCLIPs the indicators represent, thumbnails or corresponding "memory aids" of the RCLIPs may be stored in the calling party/terminal 100, thereby allowing the calling party to easily select the suitable RCLIP for the particular call. When RCLIP data is forwarded by the calling party/terminal 100 to the network 200, the network can be arranged such that the RCLIP data forwarded by the calling party/terminal 100 automatically overrides the RCLIP data stored in the network 200.

The various situations illustrated in FIGS. 1–7 by no means exhaust the various possibilities with regard to the present invention. For example, the caller can previously store RCLIP data in both the calling party/terminal 100 and in the network 200. This would be particularly useful in the case of permanently storing often used RCLIP data in the network 200 while allowing the caller to store transient RCLIP data or RCLIP data to be used once in the calling party/terminal 100. This is particularly important in the case of the calling party/terminal 100 being a wireless mobile terminal which has limited storage capability therein and which has limited bandwidth capability with regard to transferring data from it to the network.

More specifically, in the case of wireless mobile terminals, the most feasible implementation may be to introduce a Rich Calling Line Application Server and have the mobile terminal only forward an indicator to the Rich Calling Line Application Server to cause it to access its RCLIP database in accordance with the indicator from the calling mobile terminal and to forward the selected RCLIP data to the called party/terminal. In 3GPP IMS architecture, this results in a straightforward solution since with initial filter criterias, SIP signaling can be forced to pass Application Servers. Such details are noted in Technical Specifications TS 23.218 and TS 23.228, published by the 3GPP Group and available on the Internet at http://www.3gpp.org and these technical specifications are incorporated by reference herein in their entirety.

The Application Server stores the RCLIPs in its database and the mobile terminal of the caller only forwards an indicator/index to instruct the Application Server to include the selected RCLIP. In case of SIP signaling, a new header could be designed in order to enable the caller mobile terminal to send only an index parameter so that the Application Server could insert the RCLIP in the outgoing message. The BNF form of the new header could be: Rich-Call-Index="Rich-Call-Index"HCOLON 1 #option-tag. The actual values of the headers (option-tag) could be application-specific. The details with regard to the structure of the headers are noted in Technical Specification TS 24.229, also published by the 3GPP Group and available on the Internet at the address noted above.

Furthermore, the present invention is not limited to GSM systems but may also be utilized with UMTS (Universal Mobile Telecommunication System) systems and is also applicable to Internet based terminals.

Still furthermore, while the present invention has been described above with regard to mobile terminals, it is of course understood that the present invention is not limited thereto and is equally applicable to fixed terminals.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will also be apparent to those skilled in the art.

We claim:

1. A telecommunications system utilizing rich calling line handling in call setup signaling to forward RCLIP (Rich Calling Line Identification Presentation) data, the system comprising:

a calling party terminal of a caller;

a network, the calling party terminal being selectively connected thereto; and a called party terminal of a called party, the network being selectively connected to the called party terminal;

wherein, upon the caller desiring to initiate a call to the called party without RCLIP data, the calling party terminal forwards at least one call setup signal without attached RCLIP data via the network to the called party terminal; and wherein, upon the caller desiring to initiate a call to the called party with RCLIP data with caller generated RCLIP data, the calling party forwards at least one call setup signal with attached RCLIP data to the network which in turn forwards the at least one call setup signal with attached RCLIP data to the called party terminal; and wherein, upon the caller desiring to initiate a call to the called party with RCLIP data stored in an RCLIP database in the network, the calling party forwards at least one call setup signal with an indicator wherein the indicator is included within a header forwarded from the calling party terminal to the network indicating which part of RCLIP data is to be forwarded to the called party to the network and the network accesses a RCLIP database to recover part of RCLIP data corresponding to the indicator forwarded by the calling party and forwards this RCLIP data attached to the at least one call setup signal to the called party terminal.

2. The system of claim 1 wherein:
when the calling party forwards at least one call setup signal without attached RCLIP data via the network to the called party terminal, an indication is included to the network that no RCLIP data is to be forwarded to the called party terminal of the called party.

3. The system of claim 2, wherein the RCLIP data comprises at least one of: text data, voice data, video data, image data, and still picture data.

4. The system of claim 3, wherein at least one of the calling party terminal and the called party terminal comprises a wireless mobile terminal.

5. The system of claim 3, wherein the calling party terminal is selectively connected to the network via a GSM (Global System for Mobile communications) system.

6. The system of claim 3, wherein the calling party terminal is selectively connected to the network via a UMTS (Universal Mobile Telecommunications System) system.

7. The system of claim 3, wherein the network comprises an Internet server.

8. The system of claim 2, wherein at least one of the calling party terminal and the called party terminal comprises a wireless mobile terminal.

9. The system of claim 2, wherein the calling party terminal is selectively connected to the network via a GSM (Global System for Mobile communications) system and wherein the indicator is included within a header forwarded from the calling party terminal to the network.

10. The system of claim 2, wherein the calling party terminal is selectively connected to the network via a UMTS (Universal Mobile Telecommunications System) system.

11. The system of claim 2, wherein the network comprises an Internet server.

12. A method of operating a telecommunications system utilizing rich calling line handling in call setup signaling to forward RCLIP (Rich Calling Line Identification Presentation) data, the system comprising: a calling party terminal of a caller; a network, the calling party terminal being selectively connected thereto; and a called party terminal of a called party, the network being selectively connected to the called party terminal, the method comprising:
the calling party terminal forwarding at least one call setup signal without attached RCLIP data via the network to the called party terminal upon the caller desiring to initiate a call to the called party without RCLIP data; and
the calling party forwarding at least one call setup signal with attached RCLIP data to the network which in turn forwards the at least one call setup signal with attached RCLIP data to the called party terminal upon the caller desiring to initiate a call to the called party with RCLIP data with caller generated RCLIP data; and
the calling party forwarding at least one call setup signal with an indicator wherein the indicator is included within a header forwarded from the calling party terminal to the network indicating which part of RCLIP data is to be forwarded to the called party to the network and the network accesses a RCLIP database to recover the part of RCLIP data corresponding to the indicator forwarded by the calling party and forwards this RCLIP data attached to the at least one call setup signal to the called party terminal upon the caller desiring to initiate a call to the called party with RCLIP data stored in an RCLIP database in the network.

13. The method of claim 12 wherein:
when the calling party forwards at least one call setup signal without attached RCLIP data via the network to the called party terminal, an indication is included to the network that no RCLIP data is to be forwarded to the called party terminal of the called party.

14. The method of claim 13, wherein the RCLIP data comprises at least one of: text data, voice data, video data, image data, and still picture data.

15. The method of claim 14, wherein at least one of the calling party terminal and the called party terminal comprises a wireless mobile terminal.

16. The method of claim 14, wherein the calling party terminal is selectively connected to the network via a GSM (Global System for Mobile communications) system.

17. The method of claim 14, wherein the calling party terminal is selectively connected to the network via a UMTS (Universal Mobile Telecommunications System) system.

18. The method of claim 14, wherein the network comprises an Internet server.

19. The method of claim 13, wherein at least one of the calling party terminal and the called party terminal comprises a wireless mobile terminal.

20. The method of claim 13, wherein the calling party terminal is selectively connected to the network via a GSM (Global System for Mobile communications) system and wherein the indicator is included within a header forwarded from the calling party terminal to the network.

21. The method of claim 13, wherein the calling party terminal is selectively connected to the network via a UMTS (Universal Mobile Telecommunications System) system.

22. The method of claim 13, wherein the network comprises an Internet server.

23. A telecommunications system utilizing rich calling line handling in call setup signaling to forward RCLIP (Rich Calling Line Identification Presentation) data, the system comprising:
a calling party terminal of a caller;
a network, the calling party terminal being selectively connected thereto; and
a called party terminal of a called party, the network being selectively connected to the called party terminal;
wherein, upon the caller desiring to initiate a call to the called party without RCLIP data, the calling party terminal forwards at least one call setup signal without attached RCLIP data via the network to the called party terminal; and
wherein, upon the caller desiring to initiate a call to the called party with RCLIP data stored in an RCLIP database in the network, the calling party forwards at least one call setup signal with an indicator wherein the indicator is included within a header forwarded from the calling party terminal to the network indicating which part of RCLIP data is to be forwarded to the called party to the network and the network accesses a RCLIP database to recover the part of RCLIP data corresponding to the indicator forwarded by the calling party and forwards this RCLIP data attached to the at least one call setup signal to the called party terminal.

24. The system of claim 23 wherein:
when the calling party forwards at least one call setup signal without attached RCLIP data via the network to the called party terminal, an indication is included to the network that no RCLIP data is to be forwarded to the called party terminal of the called party.

25. A method of operating a telecommunications system utilizing rich calling line handling in call setup signaling to forward RCLIP (Rich Calling Line Identification Presentation) data, the system comprising: a calling party terminal of a caller; a network, the calling party terminal being selectively connected thereto; and a called party terminal of a called party, the network being selectively connected to the called party terminal, the method comprising:

the calling party terminal forwarding at least one call setup signal without attached RCLIP data via the network to the called party terminal upon the caller desiring to initiate a call to the called party without RCLIP data; and the calling party forwarding at least one call setup signal with an indicator wherein the indicator is included within a header forwarded from the calling party terminal to the network indicating which part of RCLIP data is to be forwarded to the called party to the network and the network accesses a RCLIP database to recover the part of RCLIP data corresponding to the indicator forwarded by the calling party and forwards this RCLIP data attached to the at least one call setup signal to the called party terminal upon the caller desiring to initiate a call to the called party with RCLIP data stored in an RCLIP database in the network.

26. The method of claim 25 wherein:

when the calling party forwards at least one call setup signal without attached RCLIP data via the network to the called party terminal, an indication is included to the network that no RCLIP data is to be forwarded to the called party terminal of the called party.

27. A telecommunications system utilizing rich calling line handling in call setup signaling to forward RCLIP (Rich Calling Line Identification Presentation) data, the system comprising:

a calling party terminal of a caller;

a network, the calling party terminal being selectively connected thereto; and a called party terminal of a called party, the network being selectively connected to the called party terminal;

wherein, upon the caller desiring to initiate a call to the called party without RCLIP data, the calling party terminal forwards at least one call setup signal without attached RCLIP data and with an indication to the network that no RCLIP data is to be forwarded to the called party terminal or the called party via the network to the called party terminal; and wherein, upon the caller desiring to initiate a call to the called party with RCLIP data with caller generated RCLIP data, the calling party forwards at least one call setup signal with attached RCLIP data to the network which in turn forwards the at least one call setup signal with attached RCLIP data to the called party terminal.

28. A method of operating a telecommunications system utilizing rich calling line handling in call setup signaling to forward RCLIP (Rich Calling Line Identification Presentation) data, the system comprising: a calling party terminal of a caller; a network, the calling party terminal being selectively connected thereto; and a called party terminal of a called party, the network being selectively connected to the called party terminal, the method comprising:

the calling party terminal forwarding at least one call setup signal without attached RCLIP data and with an indication to the network that no RCLIP data is to be forwarded to the called party terminal of the called party via the network to the called party terminal upon the caller desiring to initiate a call to the called party without RCLIP data; and wherein the calling party forwarding at least one call setup signal with attached RCLIP data to the network which in turn forwards the at least one call setup signal with attached RCLIP data to the called party terminal upon the caller desiring to initiate a call to the called party with RCLIP data with caller generated RCLIP data.

29. A calling party terminal for use in a telecommunications system utilizing rich calling line handling in call setup signaling to forward RCLIP (Rich Calling Line Identification Presentation) data, the system comprising:

the calling party terminal of a caller;

a network, the calling party terminal being selectively connected thereto; and a called party terminal of a called party, the network being selectively connected to the called party terminal;

wherein, the calling party terminal comprises means for the caller to initiate a call to the called party without RCLIP data with an indication to the network that no RCLIP data is to be forwarded to the called party terminal or to the called party via the network to the called party terminal.

30. The calling party terminal of claim 29 comprising:

means for the caller desiring to initiate a call to the called party with RCLIP data with caller generated RCLIP data by forwarding at least one call setup signal with attached RCLIP data to the network which in turn forwards the at least one call setup signal with attached RCLIP data to the called party terminal.

31. The calling party terminal of claim 30 wherein:

the RCLIP data is forwarded directly from the caller with the caller controlling the direct forwarding of the multimedia information and the content thereof.

32. The called party terminal of claim 30 wherein:

the RCLIP data is forwarded from the network with the caller controlling the forwarding of multimedia information from the network and the content thereof.

33. The calling party terminal of claim 30 wherein:

the RCLIP data is stored in the calling party terminal.

34. The calling party terminal of claim 30 wherein:

the RCLIP data is generated by the caller.

35. The calling party terminal of claim 30 wherein:

the RCLIP data is forwarded by the caller directly to the network which forwards the RCLIP data directly to the called party.

36. The calling party terminal of claim 35 wherein:

the RCLIP data is forwarded to the network with a communication that the RCLIP data is to be stored in a database in the network.

37. The calling party terminal of claim 29 comprising:

means for the caller to initiate a call to the called party with RCLIP data stored in an RCLIP database in the network by forwarding at least one call setup signal with an indicator wherein the indicator is included within a header forwarded from the calling party terminal to the network indicating which part of RCLIP data is to be forwarded to the called party to the network after which the network accesses a RCLIP database to recover the part of RCLIP data corresponding to the indicator forwarded by the calling party and forwards this RCLIP data attached to the at least one call setup signal to the called party terminal.

38. The calling party terminal of claim 37 wherein:

the RCLIP data is forwarded directly from the caller with the caller controlling the direct forwarding of the multimedia information and the content thereof.

39. The called party terminal of claim 37 wherein:

the RCLIP data is forwarded from the network with the caller controlling the forwarding of multimedia information from the network and the content thereof.

40. The calling party terminal of claim 37 wherein:

the RCLIP data is stored in the calling party terminal.

41. The calling party terminal of claim 37 wherein:

the RCLIP data is generated by the caller.

42. The calling party terminal of claim 37 wherein:

the RCLIP data is forwarded by the caller directly to the network which forwards the RCLIP data directly to the called party.

43. The calling party terminal of claim 42 wherein:

the RCLIP data is forwarded to the network with a communication that the RCLIP data is to be stored in a database in the network.

44. The calling party terminal of claim 29 comprising:

means for the caller desiring to initiate a call to the called party with RCLIP data with caller generated RCLIP data by forwarding at least one call setup signal with attached RCLIP data to the network which in turn forwards the at least one call setup signal with attached RCLIP data to the called party terminal; and means for the caller to initiate a call to the called party with RCLIP data stored in an RCLIP database in the network by forwarding at least one call setup signal with an indicator wherein the indicator is included within a header forwarded from the calling party terminal to the network indicating which part of RCLIP data is to be forwarded to the called party to the network after which the network accesses a RCLIP database to recover the part of RCLIP data corresponding to the indicator forwarded by the calling party and forwards this RCLIP data attached to the at least one call setup signal to the called party terminal.

45. The calling party terminal of claim 44 wherein:

the RCLIP data is forwarded directly from the caller with the caller controlling the direct forwarding of the multimedia information and the content thereof.

46. The called party terminal of claim 44 wherein:

the RCLIP data is forwarded from the network with the caller controlling the forwarding of multimedia information from the network and the content thereof.

47. The calling party terminal of claim 44 wherein:

the RCLIP data is stored in the calling party terminal.

48. The calling party terminal of claim 44 wherein:

the RCLIP data is generated by the caller.

49. The calling party terminal of claim 44 wherein:

the RCLIP data is forwarded by the caller directly to the network which forwards the RCLIP data directly to the called party.

50. The calling party terminal of claim 49 wherein:

the RCLIP data is forwarded to the network with a communication that the RCLIP data is to be stored in a database in the network.

51. The calling party terminal of claim 29 wherein:

the RCLIP data is forwarded directly from the caller with the caller controlling the direct forwarding of the multimedia information and the content thereof.

52. The called party terminal of claim 29 wherein:

the RCLIP data is forwarded from the network with the caller controlling the forwarding of multimedia information from the network and the content thereof.

53. The calling party terminal of claim 29 wherein:

the RCLIP data is stored in the calling party terminal.

54. The calling party terminal of claim 29 wherein:

the RCLIP data is generated by the caller.

55. The calling party terminal of claim 29 wherein:

the RCLIP data is forwarded by the caller directly to the network which forwards the RCLIP data directly to the called party.

56. The calling party terminal of claim 55 wherein:

the RCLIP data is forwarded to the network with a communication that the RCLIP data is to be stored in a database in the network.

* * * * *